July 18, 1961     F. BARRAGAN (RIVERA)     2,992,535
HYDRAULIC PROTECTOR FOR BRAKES
Filed Sept. 10, 1958
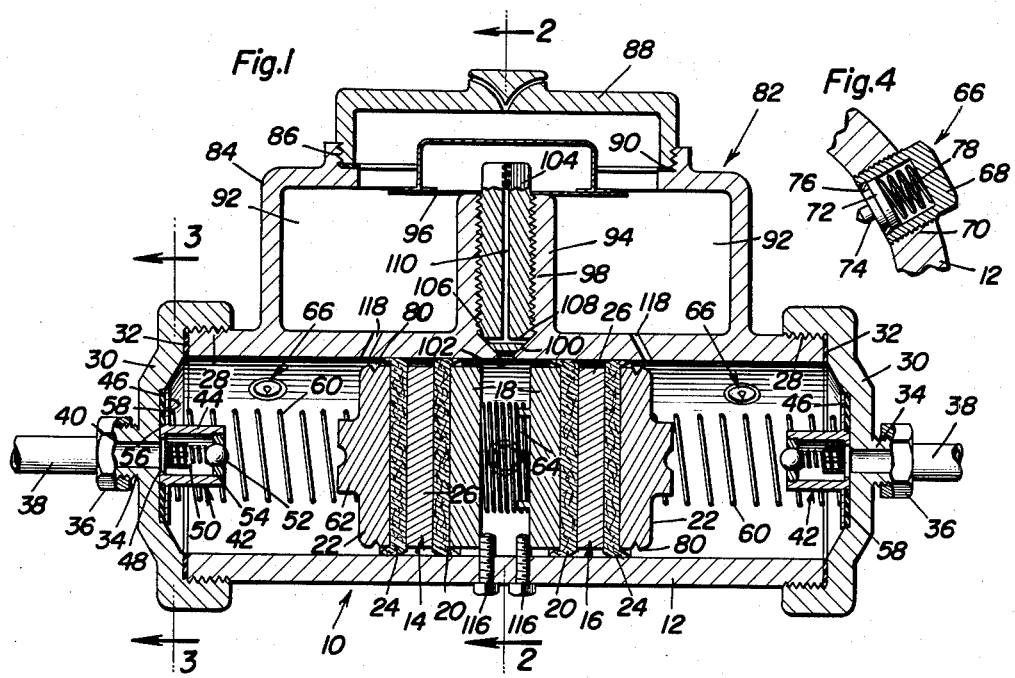
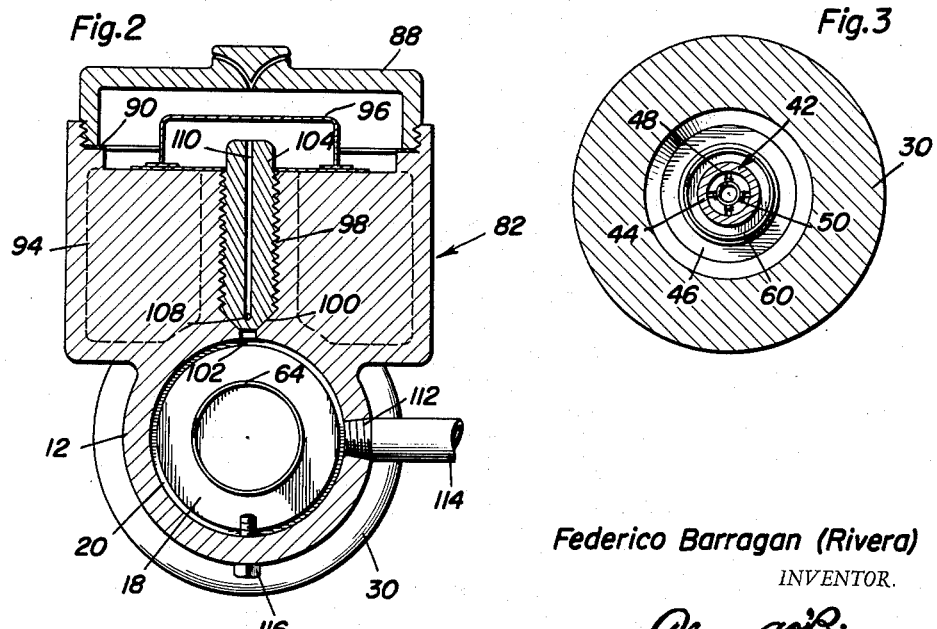
Federico Barragan (Rivera)
INVENTOR.

United States Patent Office 2,992,535
Patented July 18, 1961

2,992,535
HYDRAULIC PROTECTOR FOR BRAKES
Federico Barragan (Rivera), 103 7A St., Cuauhtemoc, Chihuahua, Mexico
Filed Sept. 10, 1958, Ser. No. 760,147
1 Claim. (Cl. 60—54.5)

This invention relates in general to new and useful improvements in vehicle brakes, and more specifically to an improved fitting for the brake lines of hydraulic brakes.

Although hydraulic brakes are used universally on automobiles, hydraulic brakes present two problems which have not been completely solved. The first problem is the breakage of a brake line. If the brake line of hydraulic brakes should break when the brakes are next applied, the hydraulic fluid is pumped out through the break in the brake line with the result that the brakes fail. Also, because of the wear of the brake linings and the fact that each time the brake pedal is actuated, only a certain amount of brake fluid is pumped to the individual wheel cylinders, as the brake lining wears, the amount of brake fluid which must be pumped each time it increases and therefore the brakes must be continuously adjusted.

It is therefore the primary object of this invention to provide an improved protective or safety device which may be mounted in the brake lines of a vehicle hydraulic brake system, the safety device being so constructed whereby there is provided an independent supply of brake fluid, which supply of brake fluid is pumped into the individual brake lines by means of pistons, there being provided one piston for each brake line whereby when one of the brake lines should fail, the pumping of hydraulic fluid to such brake line is automatically discontinued so that the brakes of the vehicle do not completely fail.

Still another object of this invention is to provide an improved attachment for brake lines of a vehicle brake system the attachment including a brake fluid reservoir, the brake fluid reservoir supplying fluid to the individual brake lines separate from the fluid disposed in the master brake cylinder whereby there is added to the brake line an amount of fluid equal to the adjustment of the brake linings so that the adjusting of the brake lining is automatically compensated.

A further object of this invention is to provide an improved safety device for hydraulic brakes, the safety device being in the form of a fitting adapted to be mounted in an individual brake line, the fitting including an elongated cylinder having two pistons mounted therein in back to back spaced apart relation for movement towards the ends of the cylinder, there being connected to the cylinder intermediate the pistons a fluid supply line from a master brake cylinder, there being disposed within the cylinder between the ends of the cylinders and the pistons an auxiliary hydraulic fluid supply, the brake fluid supply line pumping fluid into the cylinder between the pistons and forcing the pistons apart with the pistons also functioning as pumps to pump the additional hydraulic brake fluid into the individual wheel cylinders whereby in the event of the breakage of a brake line between the safety device and the wheel cylinder, only a small amount of the brake fluid will be lost and continued operation of the brake system may be had.

These together with other objects and advantages which will become subsequently apparent reside in the details of construction and operation shown and described, and accordingly, reference is had to the accompanying drawings forming a part hereof, wherein like numerals refer to like parts throughout, and in which:

FIGURE 1 is a longitudinal sectional view taken through the center of the safety device which is the subject of this invention and shows the general details thereof;

FIGURE 2 is a transverse vertical sectional view taken substantially upon the plane indicated by the section line 2—2 of FIGURE 1 and shows the cross-section of the safety device including the partition dividing the reservoir into two halves;

FIGURE 3 is a transverse vertical sectional view taken substantially upon the plane indicated by the section line 3—3 of FIGURE 1 and shows the general details of a check valve assembly carried on opposite ends of the cylinder; and FIGURE 4 is an enlarged fragmentary transverse sectional view taken through an automatic latch retaining the pistons in projected positions in the event of a brake line failure.

Referring now to the drawings in detail, it will be seen that there is illustrated the safety device which is the subject of this invention, the safety device being referred to in general by the reference numeral 10. The safety device 10 includes an elongated cylinder 12. The cylinder 12 has mounted therein a pair of opposed piston assemblies 14 and 16. The piston assemblies 14 and 16 are identical and each includes a force receiving piston 18 which carries a cup 20. Each piston assembly 14 and 16 also includes a pumping piston portion 22 which has associated therewith a cup 24. The cups 20 and 24 are separated by means of a spacer 26.

The ends of the cylinder 12 are externally threaded as at 28 and have threadedly engaged thereon end caps 30. The end caps 30 are sealed relative to the cylinder 12 by means of sealing rings 32. Each of the end caps 30 is provided with an externally threaded reduced extension 34 to which there is connected by means of a fitting 36 a wheel brake line 38. The end cap 30 and its fitting 34 is provided with a bore 40 therethrough for supplying hydraulic brake fluid to the individual wheel brake line 38.

Disposed within the cylinder 12 at opposite ends thereof and bearing against an associated one of the end caps 30 is a check valve assembly which is referred to in general by the reference numeral 42. Each check valve assembly 42 includes a cylinder-like member 44 having a locating flange 46. Mounted within the cylinder 44 is a spring retainer 48 in which there is mounted a spring 50. The spring 50 in turn engages a ball valve member 52 which engages a valve seat 54 removably carried by the cylinder 44. The cylinder 44 has a short extension 56 on which there is mounted an annular sealing member 58. The sealing member 58 is of a size to snugly be received in its respective end cap 30 and has bearing thereagainst the flange 46 to form a seal with the end cap 30.

Telescoped over the cylinder 44 and bearing against the flange 46 is one end of a coil spring 60. The opposite end of the coil spring 60 abuts against the piston portion 22 and is telescoped over a projection 62 thereof. The spring 60 also functions to retain the seal between the flange 46, the sealing member 58 and the end cap 30. Disposed intermediate the piston assemblies 14 and 16 is a coil spring 64 which engages the piston portions 18 and urges the piston assemblies 14 and 16 apart. The check valve assemblies 42 permit the fluid in the brake lines to be kept under a slight pressure at all times thereby lessening the likelihood of leakage. Moreover, if a gravity leak does occur, only the fluid in the leaky line will be lost inasmuch as the check valve will prevent the fluid in the end of the cylinder from escaping.

Carried by the cylinder 12 adjacent opposite ends thereof are automatic latch devices 66. As is best illustrated in FIGURE 4, each automatic latch device 66 includes a cup-like member 68 which is threadedly engaged in an internally threaded bore 70 in the cylinder 12. The cup shaped member 68 has disposed therein a latch member 72 which has a projecting pin portion 74. The latch member 72 is disposed in the cup shaped member 68 by means of a locking ring 76. The latch member 72 is urged into the cylinder 12 by means of a spring 78. Each of the piston portions 22 is provided with a circumferential groove 80 for receiving the pin portion 74 of its respective latch assembly 66.

Formed integral with the cylinder 12 is a reservoir which is referred to in general by the reference numeral 82. The reservoir 82 includes a body portion 84 which extends upwardly from the cylinder 12 and which is provided with a filler opening 86. Removably threadedly engaged in the filler opening 86 is a cap 88 which may be removed to facilitate the filling of the reservoir 82.

The cap 88 is sealed relative to the body 84 by means of a gasket 90.

The reservoir 82 is divided into separate compartments 92 by means of a transverse wall 94. Seated on the transverse wall 94 is a hydraulic fluid deflector 96 which is best illustrated in FIGURES 1 and 2. The deflector facilitates the distribution of fluid poured onto it into both compartments 92.

In order to facilitate the bleeding of air from between the piston assemblies 14 and 16, there is provided an internally threaded, vertically extending bore 98 in the partition wall 94 which terminates at its lower end in a conical portion 100 which opens into the cylinder 12 through an opening 102. Threadedly engaged in the bore 98 is a novel valve member 104 which has a conical lower end 106 adapted to engage the valve seat 100. The valve member 104 is provided in the lower part thereof with a transverse bore 108 which intersects a longitudinal wall 110 opening through the upper end of the valve member 104.

The central part of the cylinder 12 is provided with an internally threaded bore 112 in which there is threadedly engaged an end of a hydraulic fluid supply line 114 whose opposite end will be connected to a master brake cylinder (not shown) for supplying hydraulic fluid under pressure into the cylinder 12 between the piston assemblies 14 and 16 when the brakes of the vehicle are to be applied.

In order to prevent the movement of the piston assemblies 14 and 16 towards each other so as to close the fluid supply line 114, there is carried by the cylinder 12 a pair of stop members 116 which are in the form of bolts threadedly engaged through the cylinder 12, as is best shown in FIGURE 1.

In the use of the present invention, the safety device 10 is to be mounted in the hydraulic brake system immediately adjacent the brake cylinder. For each pair of vehicle wheel brakes there is provided one of the safety devices 10, although there may be one safety device 10 for the whole brake system with the brake lines 38 being divided and going to two individual wheel brakes. The use of the safety device 10 in the vehicle brake system may be varied as desired.

In order that the air from the brake system may be removed, the valve member 104 is provided. When the valve member 104 is moved to an open position and the master brake cylinder is actuated, air will be forced from the space between the piston assemblies 14 and 16. When the air has been bled from this space and from the supply line 114, then the valve member 104 is moved to a closed position.

In the normal operation of the safety device 10, when the brake system of a vehicle is energized, hydraulic fluid is pumped into the cylinder 12 between the piston assemblies 14 and 16. This will force the piston assemblies 14 and 16 apart with the piston assemblies 14 and 16 functioning as pumps. The piston assemblies 14 and 16 will then pump the hydraulic fluid from the end portions of the cylinder 12 out through the wheel brake lines 38, this latter hydraulic fluid being separate and distinct from the hydraulic fluid which is pumped into the cylinder 12 from the master brake cylinder. When hydraulic brake fluid is being pumped by the piston assemblies 14 and 16, the ball valve members 52 will be unseated and the hydraulic fluid pumped through the brake lines 38. On the other hand when the pressure is removed from between the piston assemblies 14 and 16, the springs 60 will urge the piston assemblies 14 and 16 back to their original positions of FIGURE 1 and the pressure of the brake shoe return springs will force the hydraulic fluid back through the brake lines 38. This will unseat the check valve assembly 42 from its respective end cap 30 and permit the return flow of the hydraulic brake fluid into the ends of the cylinder 12. Since the spring 60 maintains slight pressure on the brake line fluid at all times, continuous and rapid actuation of the brakes is made possible.

It is to be noted that when the piston assemblies 14 and 16 are in their retracted positions, the reservoir 82 is communicated with the end portions of the cylinder 12 by means of supply passages 118. However, the piston assemblies 14 and 16, after their initial movement, will close the supply passages 118. The provision of the supply passages 118 will assure the constant feeding of additional hydraulic brake fluid into the end of the cylinder 12 to compensate for any wear of the brake lining.

In the event one of the wheel brake lines 38 should fail or the individual wheel cylinder (not shown) should fail, when the brakes of the vehicle are applied, the particular piston of the piston assemblies 14 and 16 will be forced towards its end cap 30. This, of course, will result in the pumping of the hydraulic fluid out of the particular end of the cylinder 12. Once this has occurred, the latch unit 66 will engage the respective piston assembly and retain its piston portion 22 in an outermost position. The projecting portion 62 will then engage the respective check valve assembly 42 and prevent it from becoming unseated from the end cap 30. Thus continued operation of the hydraulic brake system will prevent pumping of the brake fluid through the brake in the brake line or the individual wheel cylinder. It will therefore be appreciated that only the fluid in the leaky line and one end of the cylinder will be lost through a leak.

From the foregoing, it will be seen that in a hydraulic brake system provided with safety devices in accordance with this invention it will be so constructed whereby the brake system will not be rendered inoperative in the event there should be a break in one of the individual brake lines. Further, from the foregoing description of the invention, it will be seen that it is relatively simple so that the cost of manufacture is economically feasible and it may be readily mounted in both existing vehicle brake systems and new brake systems.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A safety device for hydraulic brakes comprising a fitting adapted to be placed in the hydraulic lines of a hydraulic brake system having a master cylinder and leading to at least one pair of wheels, said fitting including an elongated cylinder encompassing a constant diameter cross-sectional area free of obstructions, removable end caps closing opposite ends of said cylinder, a pair of opposed pistons disposed within said cylinder in spaced relation, a main brake fluid supply fitting opening into a central part of said cylinder intermediate said pistons for supplying fluid under pressure from a master cylinder to said elongated cylinder to move said pistons apart, wheel brake lines connected to said end caps, and fluid disposed within said elongated cylinder intermediate said pistons and said end caps whereby fluid is pumped through said wheel brake lines by said pistons, a reservoir carried by said cylinder, fluid supply passages communicating said reservoir with said cylinder intermediate said pistons and respective ones of said end caps and valve controlled bleeder passages communicating said reservoir with said central part of said cylinder, said reservoir including a wall defining a reservoir compartment on either side thereof, a fluid deflector mounted on and perpendicularly extending from the wall for deflecting fluid into both of said compartments, check valve assemblies mounted against said end caps controlling the flow of fluid through said wheel brake lines, said pistons having circumferential grooves formed in their remote ends substantially V-shaped in cross-section, automatically engaging and releasing spring urged detent means having a pin terminating at its inner end in a conical point and normally projecting radially and inwardly of said cylinder on opposite ends thereof engageable with the corresponding grooves to releasably retain said pistons in their outermost positions in said cylinder upon movement of the pistons to those positions and disengageable from engagement with said grooves upon increase of pressure in said wheel brake lines, said cylinder including inwardly projecting and removable abutment means limiting movement of said pistons toward each other and defining said central part of said cylinder, the remote ends of said pistons each including an axially extending projection engageable with the corresponding check valve assembly for establishing said outermost positions of said pistons.

References Cited in the file of this patent

UNITED STATES PATENTS

| | | |
|---|---|---|
| 1,952,557 | Masteller | Mar. 27, 1934 |
| 2,292,925 | Bourgeois | Aug. 11, 1942 |
| 2,560,105 | Hart | July 10, 1951 |
| 2,568,311 | Wise et al. | Sept. 18, 1951 |
| 2,650,863 | Fore | Sept. 1, 1953 |
| 2,827,134 | Raia | Mar. 18, 1958 |

FOREIGN PATENTS

| | | |
|---|---|---|
| 156,223 | Australia | Apr. 27, 1954 |
| 226,590 | Switzerland | July 1, 1942 |